United States Patent Office.

HENRY HAUER, OF PHILADELPHIA, PENNSYLVANIA, ADMINISTRATOR OF THE ESTATE OF LOUIS BAUHOEFER.

*Letters Patent No.* 59,342, *dated November* 6, 1866; *reissue No.* 3,282, *dated February* 2, 1869.

A.

IMPROVED METHOD OF TREATING CORK FOR THE MANUFACTURE OF MATTRESSES, &c.

The Schedule referred to in these Letters Patent and making part of the same.

*To all whom it may concern:*

Be it known that LOUIS BAUHOEFER, late of Philadelphia, Pennsylvania, deceased, did invent a Method of Treating Cork for Mattresses, &c., for which Letters Patent of the United States were granted to him on the 6th day of November, 1866; and I, HENRY HAUER, executor and administrator of the estate of the said LOUIS BAUHOEFER, do hereby declare the following to be a full, clear, and exact description of that part of the invention which consists—

First, in subjecting particles of cork to be used as stuffing for mattresses, &c., to the action of the products of the combustion of wood, tan, or other equivalent material, this fumigation of the cork rendering the same less liable to become mouldy and foul than ordinary unprepared cork.

Second, in charring, roasting, or partially burning particles or pieces of cork, so as to render the same light, soft, elastic, and less liable to absorb moisture, than crude cork, and consequently better adapted than the latter to stuffing of mattresses, and other packing or filling-purposes.

Third, in subjecting the cork to the action of the fumes or vapors arising from burning or heated aromatic substances, which impart an agreeable odor to the cork, and at the same time prevent the lodgment of insects therein.

In order to enable others to practise the invention, I will now proceed to describe the manner of carrying the same into effect.

The cork is first broken, ground, or granulated, or cut into pieces of appropriate size, and a mass of the particles is then placed in a perforated casing or wire screen, caused to revolve over burning fuel, the products of combustion being thus brought into intimate contact with every particle of cork, which is thus so thoroughly fumigated, that its liability to become mouldy and foul is lessened. At the same time the baking, charring, or partial burning of the cork particles, by this or equivalent treatment, renders them light, soft, and elastic, and more serviceable as a packing or stuffing material than crude cork.

Bay-leaves, or other aromatic substances, may be thrown on to the fire, during the fumigation or roasting of the cork, the aroma thereby acquired by the same, preventing the lodgment and ravages of insects.

Without confining the invention of the said LOUIS BAUHOEFER to the use of any specific materials for fumigating or scenting the cork, or to any specific appliances for roasting or charring the same,

I claim as his invention, and desire to secure by Letters Patent—

1. Subjecting particles of cork, to be used as a stuffing-medium for mattresses, cushions, &c., and for other packing-purposes, to the action of the products of combustion, for the purpose specified.

2. Charring, roasting, or partially burning particles of cork, (to be used as a filling-material,) for the purpose described.

3. Subjecting particles of cork to the action of the fumes or vapors of burning or heated aromatic substances, as and for the purpose specified.

In testimony whereof, I have signed my name to this specification, before two subscribing witnesses.

HENRY HAUER.

Witnesses:
H. HOWSON,
JOHN WHITE.